United States Patent
Kuerbitz et al.

(10) Patent No.: US 7,098,458 B2
(45) Date of Patent: Aug. 29, 2006

(54) SYSTEM AND METHOD FOR GENERATING THREE-DIMENSIONAL IMAGE DISPLAYS

(75) Inventors: Gunter Kuerbitz, Koenigsbronn (DE); Harry Schlemmer, Oberkochen (DE); Holger Vogel, Aalen (DE)

(73) Assignee: Zeiss Optronik GmbH, Oberkochen (DE)

( * ) Notice: Subject to any disclaimer, the term of this patent is extended or adjusted under 35 U.S.C. 154(b) by 0 days.

(21) Appl. No.: 10/860,879

(22) Filed: Jun. 3, 2004

(65) Prior Publication Data

US 2004/0256558 A1 Dec. 23, 2004

(30) Foreign Application Priority Data

Jun. 7, 2003 (DE) ................. 103 25 821

(51) Int. Cl.
*G02F 1/01* (2006.01)
(52) U.S. Cl. .................................. 250/330
(58) Field of Classification Search ............ 250/330
See application file for complete search history.

(56) References Cited

U.S. PATENT DOCUMENTS

| | | | |
|---|---|---|---|
| 4,380,391 A | 4/1983 | Buser et al. | |
| 4,672,439 A | 6/1987 | Florence et al. | |
| 4,674,874 A | 6/1987 | Halldorsson et al. | |
| 4,751,570 A | 6/1988 | Robinson | 358/88 |
| 5,079,414 A | 1/1992 | Martin | |
| 6,178,340 B1 * | 1/2001 | Svetliza | 600/310 |
| 6,246,822 B1 | 6/2001 | Kim et al. | |
| 6,350,031 B1 * | 2/2002 | Lashkari et al. | 351/221 |
| 6,521,892 B1 | 2/2003 | Emanuel et al. | |
| 6,646,799 B1 * | 11/2003 | Korniski et al. | 359/407 |
| 6,727,984 B1 | 4/2004 | Becht | |
| 2001/0045978 A1 | 11/2001 | McConnell et al. | 348/42 |
| 2003/0235335 A1 * | 12/2003 | Yukhin et al. | 382/190 |

FOREIGN PATENT DOCUMENTS

| | | |
|---|---|---|
| DE | 43 32 381 A1 | 3/1995 |
| DE | 19834204 A1 | 2/2000 |
| EP | 1 154 639 A1 | 1/2001 |
| FR | 2 517 916 | 6/1983 |

OTHER PUBLICATIONS

Krug et al., Application of a 6×8 Silicon APD Array and Hybrid Electronics for Scannerless 3D Imaging Ladar, NATO/IRIS Active Systems, 1995, vol. 11, pp. 79-89.
H.N. "Buck" Burns et al., Compact Multichannel Receiver Using InGaAs APDs for single pulse, eye-safe, laser radar imagery, 1997, SPIE vol. 3065, 1997, pp. 22-29.

* cited by examiner

*Primary Examiner*—David Porta
*Assistant Examiner*—Marcus Taningco
(74) *Attorney, Agent, or Firm*—Wells St. John, P.S.

(57) ABSTRACT

A system and a method for generating three-dimensional image displays with two sensors, in particular two thermal imagers, having two optical channels with fields of view of equal size and with a virtually identical line of sight has at least one image reproduction unit. The optical axes of the sensors are aligned in parallel with one another. The sensors are each provided with a detector for a stereo recording, the stereo recording being performed simultaneously by means of the detectors.

28 Claims, 3 Drawing Sheets

SYSTEM AND METHOD FOR GENERATING THREE-DIMENSIONAL IMAGE DISPLAYS

CROSS REFERENCE TO RELATED APPLICATION

This application relates to and claims priority to corresponding German Patent Application No. 103 25 821.3, which was filed on Jun. 7, 2003, and which is incorporated by reference herein.

BACKGROUND OF THE INVENTION

1. Field of the Invention

The invention relates to a system and a method for generating three-dimensional image displays, in particular for generating three-dimensional thermal imagers.

2. Description of the Related Art

A three-dimensional display of thermal imagers has already been disclosed by DE 43 32 381 A1, in which case an image reproduction system is described which is of modular design and includes two stereo modules of identical mirror-image design. Two pairs of optics, two pairs of frame memories and two image display devices are provided for a stereo recording and a stereo reproduction. The stereo recording is performed alternately by means of only one image detector. In this case, the beam paths of the two stereo modules are superimposed in a temporally alternating fashion on a common beam path. The detector used is temporally controlled by a synchronization unit and is synchronized with the periodic changeover of the beam paths. The image data are converted into signals with the aid of a scanning converter and are fed to an image processing unit. The images of the narrow and the wide fields of view, or the right-hand and the left-hand stereo channels, are fed respectively in an alternating fashion to the detector and stored in a frame memory at different time intervals. This operation is repeated periodically and progressively.

As when recording by means of two unsynchronized detectors, the disadvantage of this design resides in the fact that owing to the different recording instants, moving objects are located at slightly different points inside the partial images. This leads disadvantageously to an undesired displacement of the moving objects in space. Depending on the temporal sequence of the two partial images and on the very movement of the object, moving objects are therefore displayed in a fashion detached from the coverage area in space, or migrate directly into the display area.

It is equally to be regarded as particularly disadvantageous of the image reproduction system of DE 43 32 381 A1 that when updating the display of the stereo image after recording each partial image, the temporal relationships of the left-hand partial image to the right-hand partial image are still reversed. As a result, the object is displayed in an alternating fashion at in each case half the frequency in the scene and in a detached fashion. If this happens, the stereoscopic viewing of the object fails.

SUMMARY OF THE INVENTION

It is the object of the invention to provide a device and a method for generating three-dimensional thermal imagers which avoids the disadvantages, outlined above, of the prior art, in order in this way to acquire information on the target area to be observed which is more specific.

The object of the invention is achieved by means of the features of claims 1 and 19.

According to the invention, the system is provided with two sensors, in particular two thermal imagers which record the same observation scene at a horizontal spacing from one another, having two optical channels with fields of view of equal size and with a virtually identical line of sight, and having at least one image reproduction unit. It is particularly important here that the fields of view of the optical channels correspond very well, in order to provide and/or ensure a good three dimensional or stereoscopic visual impression. The two sensors are each provided with a detector, advantageously of synchronized design, and this permits a simultaneous or temporally parallel stereoscopic recording of a target area.

In a particularly advantageous refinement of the invention, it is provided that said first sensor is arranged on a first moveable device and said second sensor is arranged on a second moveable device, said first and said second sensor having optics with an identical resolution, and wherein thermal images recorded with said first and said second sensor are displayed to one and the same observer simultaneously to generate stereoscopic image pairs.

If the sensors or thermal imagers are specifically arranged in two moveable devices (vehicles) the individual images can be combined to form a stereo image given correspondence of the fields of view and parallelism of the optical axes to one another. It is particularly advantageous in this case that the relatively large basis produces a substantial stereo effect which permits good observation performance even over large target ranges.

In a likewise advantageous way, said first and said second sensor are arranged on a single moveable device, said first and said second sensor having optics with an identical resolution, and wherein thermal images recorded with said first and said second sensor are displayed to one and the same observer simultaneously to generate stereoscopic image pairs.

Of course, it is also possible to arrange two thermal imagers in a single moveable device (vehicle), although in this case the thermal imagers are to be arranged horizontally at a spacing from one another, in order to generate a stereoscopic image given parallelism of the optical axes of the thermal imagers and given fields of view of equal size. This design is particularly advantageous when a single vehicle, for example a military vehicle, is to operate alone.

A further advantageous refinement of the invention provides that the system further comprising a basis plate and wherein said first and said second sensor are arranged in parallel next to one another on said basis plate and form a thermal imager-binoculars with a fixed stereo basis.

Of course, the ability to see in three dimensions is advantageous not only with a large basis and at long ranges. The combination of the two miniaturized thermal imagers by which the implementation of a thermal imager-binoculars which affords the observer by night the advantages which are open to him during the day when using known binoculars.

A fourth advantageous refinement of the invention provides, moreover, that said two sensors are combined in the manner of a II-driver's visual display unit to form a driver's thermal imager.

In the case of vehicles, in particular military vehicles, it is very expedient also to equip the driver with a stereo thermal imager instead of an image intensifier system, so as to be able to travel safely around any problem even in complete darkness.

DETAILED DESCRIPTION

Figure 1:
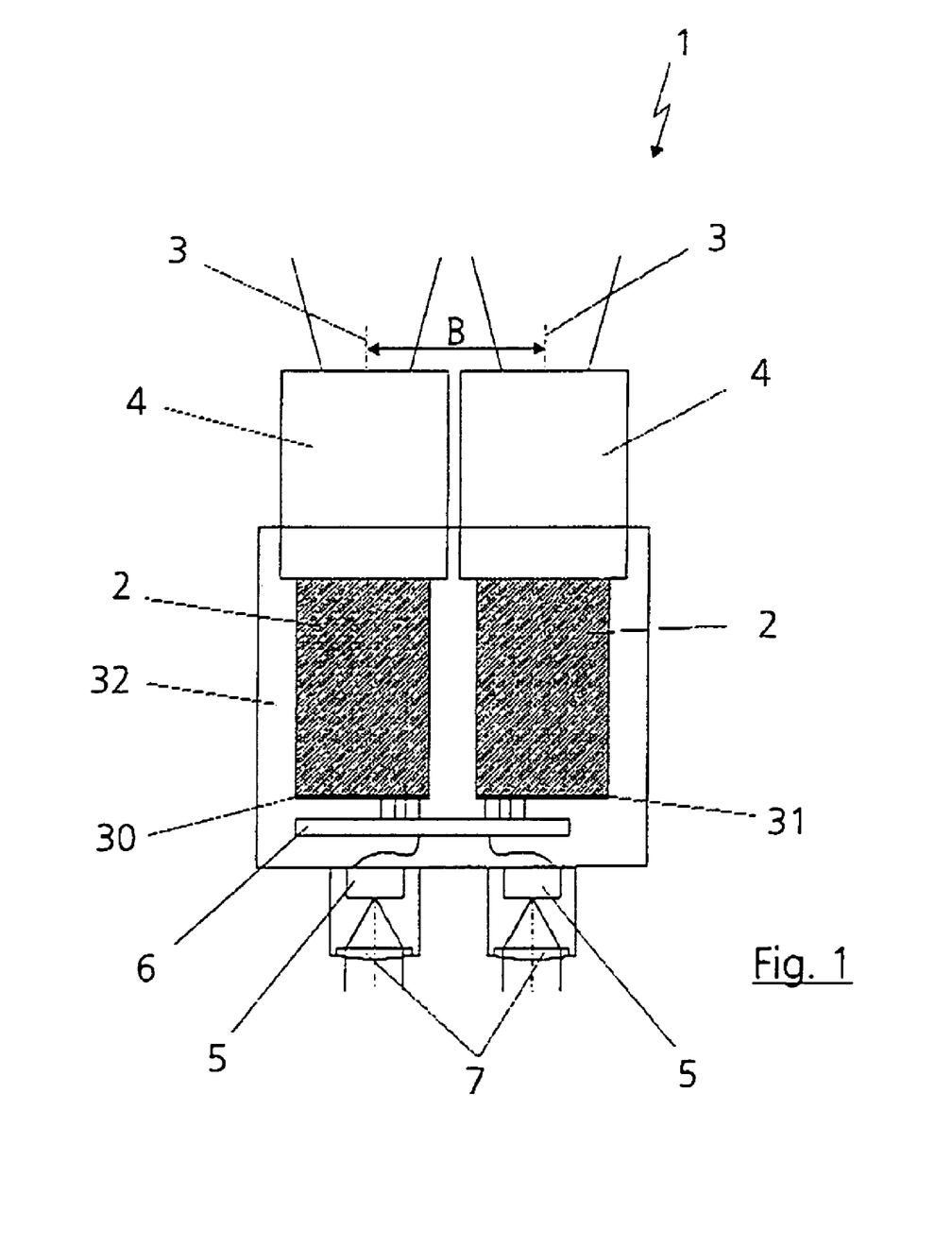
FIG. 1 shows an outline illustration of a thermal imager-binoculars according to the invention, with an illustration of the fields of view.

An inventive thermal imager-binoculars 1 is illustrated in outline in FIG. 1. Two miniaturized thermal imagers 2 with individual sensors, as detectors 30, 31, being sensitive to infrared radiation are combined with one another in this case. It is possible, for example, to use relatively cost-effective thermal imagers which operate with uncooled detectors. With such a handheld stereo thermal imager-binoculars 1, individual cameras with a focal length of 50 mm, for example, are arranged directly next to one another on a basis plate 32 and aligned in such a way that optical axes 3 of optics and objectives 4 of both thermal imagers 2 run parallel. This arrangement results in a stereo basis, denoted by B here, which, at approximately 100 mm, is only slightly greater than the mean interpupillary distance (PD) of approximately 64 mm. This mean interpupillary distance differs from observer to observer, however. Nevertheless, it is possible with the aid of such 50 mm objectives 4 to implement a sufficiently large stereo area which corresponds approximately to the area which can be achieved with the naked eye.

However, in addition to the objective set forth above it is also likewise possible to use other objectives (with different focal lengths). However, it should always be ensured that the optics of the two thermal imagers 2 and of the thermal imager-binoculars 1 are not different, since otherwise no stereopsis can occur. Also to be seen in FIG. 1 are two image reproduction units 5 (monitors or displays) which, when seen directly in the beam direction, are arranged downstream of control, regulation and display electronics 6. The thermal images generated can be assigned to the respective eye of an observer via eyepieces 7 and the image reproduction units 5. The stereo reproduction of the thermal images is performed simultaneously, that is to say the associated image is offered simultaneous to the respective eye. The three-dimensional image or the stereoscopic impression then arises in the observer's brain owing to merging of the two partial images.

It is already generally known that generating a good three-dimensional impression requires two individual images to correspond very well with reference to size, magnification, rotation and field of view, and this means that the two thermal imagers 2 must be aligned and/or arranged identically and parallel to one another.

The stereo images are reproduced via the two small eye-piece monitors 5 which are permanently connected to the basis plate, which also accommodates the individual cameras. It is possible for the eyepiece image reproduction units 5 (monitors) to be set to the respective interpupillary distance of each individual observer.

Figure 2:
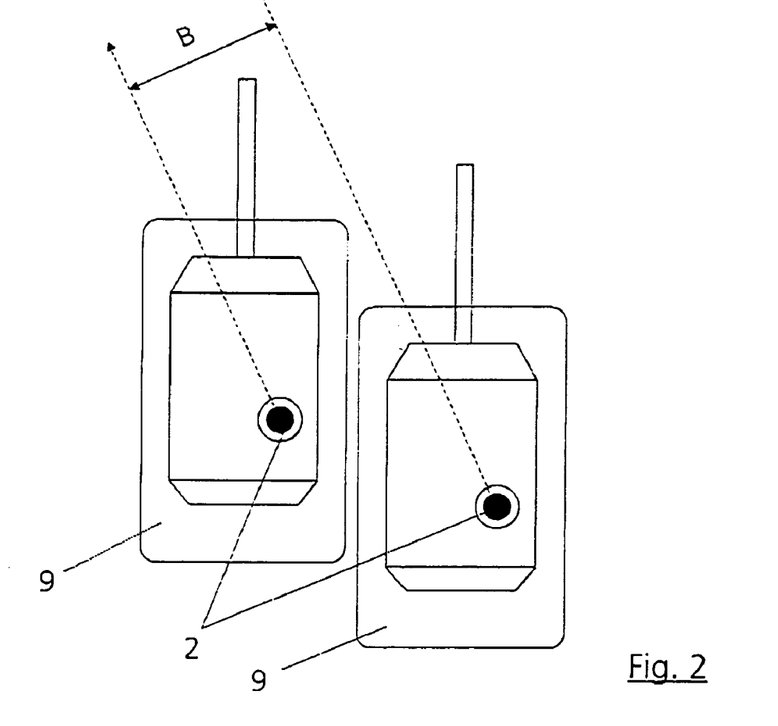
FIG. 2 shows an outline illustration of two devices, in particular two vehicles, on which a thermal imager is arranged in each case.

Two devices 9, in particular two vehicles, which are provided in each case with a thermal imager 2 are shown in FIG. 2. Here, as well, a detailed illustration of the thermal imagers 2 is dispensed with, since the design of thermal imagers is already known from the prior art such as, for example, from U.S. Pat. No. 4,672,439 or U.S. Ser. No. 09/248,507. It is likewise known from the visual spectral range (380–780 nm) that an impression of depth which an observer has is more intense the greater the spacing B between the two sensors or thermal imagers 2.

According to the invention, it is therefore possible for identical thermal imagers 2 to be interconnected close to jointly operating vehicles 9 such that they form a stereo pair. Given the presence of thermal imagers 2, on two vehicles 9, it is necessary to ensure by means of data transmission, for example by radio, that the thermal imagers 2 are aligned in parallel in the neighbouring vehicles 9 in the stereo mode. It is likewise to be assumed that the same operational modes such as, for example, field of view and polarity, are switched on in the two thermal imagers 2. The fields of view can be brought into correspondence by using zoom lenses.

It is known that the best result is obtained when both thermal imagers 2 are of identical design. However, it is also possible to match the fields of view in an electronic way in the image for example by means of a section with interpolation of the larger field of view. The data transmission likewise serves alternately for transmitting the video signals.

The reproduction or the display of the stereo image can be undertaken using the generally known and customary methods. It is also possible in addition to displaying the generated thermal images via two image reproduction units 5 for them to be displayed to the observer on a monitor or else by projection. It goes without saying that other methods of display or display procedures are also incorporated here. If methods of a different type are preferred, the optical channels must be separated with reference to colour space, polarization space etc.

Figure 3:
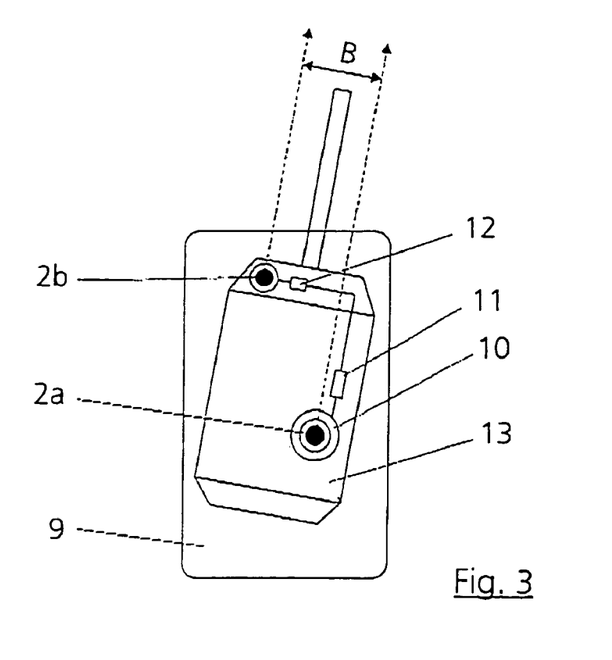
FIG. 3 shows an outline illustration of a device, in particular a vehicle, on which two thermal imagers are arranged.

Given a novel design of vehicles 9, it is possible to provide two completely identical thermal imagers 2a, 2b, for example a thermal imager 2b for the gunner and a thermal imager 2a for the commander of the vehicle, such that stereo viewing with the aid of thermal imagers 2a, 2b is also possible for a single vehicle 9, as may be seen in FIG. 3. In the normal case, the directions of view of the gunner do not correspond to the direction of view of the commander. However, before the gunner fires a shot, for example, it can be advantageous for the commander's thermal imager to be switched over to the gunner before firing in order for him to be able to take a more accurate aim on the object by means of stereo viewing. However, this does not require any data transmission link by radio or optoelectronically, since the thermal imagers 2a, 2b are networked to one another inside the vehicle 9.

To provide to the gunner the possibility of stereoscoping imaging the thermal imager 2a of the commander is arranged rotatably to the common base 13 of both thermal imagers 2a, 2b with a motor drive 10 providing a rotation of the thermal imager 2a of the commander with respect to the common base 13. Additionally a motor control 11 is provided which controls the drive of the motor drive 10. The thermal imager 2b of the gunner has a command key 12, either in hardware or in software form, by actuation of which the motor control 11 activates the motor drive 10 of the thermal imager 2a of the commander to adjust its optical axis parallel to the optical axis of the gunner. Now when both thermal imagers 2a, 2b are aligned with parallel optical axis the imaging signals of the thermal imager 2a of the commander are transmitted additionally to the reproduction unit of the thermal imager 2b of the gunner to generate stereoscopic image pairs. Additionally it is also possible to transmit the imaging signals of the thermal imager 2b of the gunner to the thermal imager 2a of the commander so that also the commander can have a stereoscopic image. In particular cases, when the field of views of the two thermal imagers 2a, 2b are slightly different it can become necessary to provide an image processing as an intermediate step to one of the two thermal images 2a, 2b to adjust both fields of view, for example by deleting or neglecting the periphery image pixels from that image having the larger field of view.

In principle a similar control just described for the case that both thermal imagers are arranged on the same base or vehicle can also be provided in the case of different vehicles as described with reference to FIG. 2. In the case of different vehicles however it is necessary that either both vehicles have a sensor detecting the orientation of the vehicle in space or at least one of the vehicles has a sensor providing information how both vehicles are oriented with respect to one another. Additionally a data transfer between both vehicles is necessary to transmit a command signal which causes a respective rotation of the other vehicle, or of the other thermal imager, to the other vehicle as well as to transmit an information according regarding the orientation of both vehicles with respect to one another can become necessary or desirable. Additionally a data transfer of the imaging signals from one vehicle to the other will be necessary as already outlined above.

In both embodiments it can be desirable to additionally provide to the thermal imager the orientation of which is to be changed because of a command from the other thermal imager the possibility to refuse the command so that no rotation of the other thermal imager will occur. For example, the control of the motor drive 10 in FIG. 3 will only cause a rotation to the thermal imager 2a of the commander if and after the commander has confirmed the requested command by also pushing a key.

It is likewise possible to configure the systems or thermal imager systems illustrated in FIGS. 1 to 3 in a different way. In this case, the two thermal imagers 2 can be combined in the manner of an image intensified driver's visual display unit (so called II-display) to form a driver's thermal imager. During nighttime operations of such vehicles 9, in particular tanks, a corner mirror is exchanged for an image intensifier system (II-system) in order to obtain a better view. Since this is useless in complete darkness, given the absence of any residual light, a thermal imager system relating to the driver's view can be used instead of an image intensifier system. This thermal imager system also comprises two sensors or thermal imagers 2. The thermal imagers 2 can likewise be produced in a miniaturized design as in the case of the handheld thermal imager-binoculars 1. In this case, the thermal imagers 2 have a relatively large field of view and a basis B corresponding approximately to the natural interpupillary distance. As in the case of the handheld thermal imager-binoculars 1 shown in FIG. 1, it is also possible to make use of uncooled detectors, which are substantially more cost-effective than the cooled ones, and these can be used advantageously, for example, in the design according to FIGS. 2 and 3, in order to reduce the thermal background noise.

Because of the depth information, which is exceptionally advantageous when driving in trackless terrain, it is possible to drive much more safely and quickly with the aid of such a driver's thermal imager 2 than using monocular devices as are known from the prior art.

Such systems according to the invention can be used in wavelength regions 0,8 to 2.5 μm, 3 to 5 μm or 7 to 14 μm, in order thus to achieve substantial advantages with reference to unambiguous and more detailed spatial information such as, for example, elevations or depressions in the terrain.

The stereo recording can be performed by means of fixed detectors or else by means of a scanner system.

A particularly important precondition for generating three-dimensional thermal imagers consists in that the connecting line between the two thermal imagers 2 may not be in the observing direction. This means that the two thermal imagers 2 must always be aligned parallel to one another at a horizontal spacing.

Figure 4:
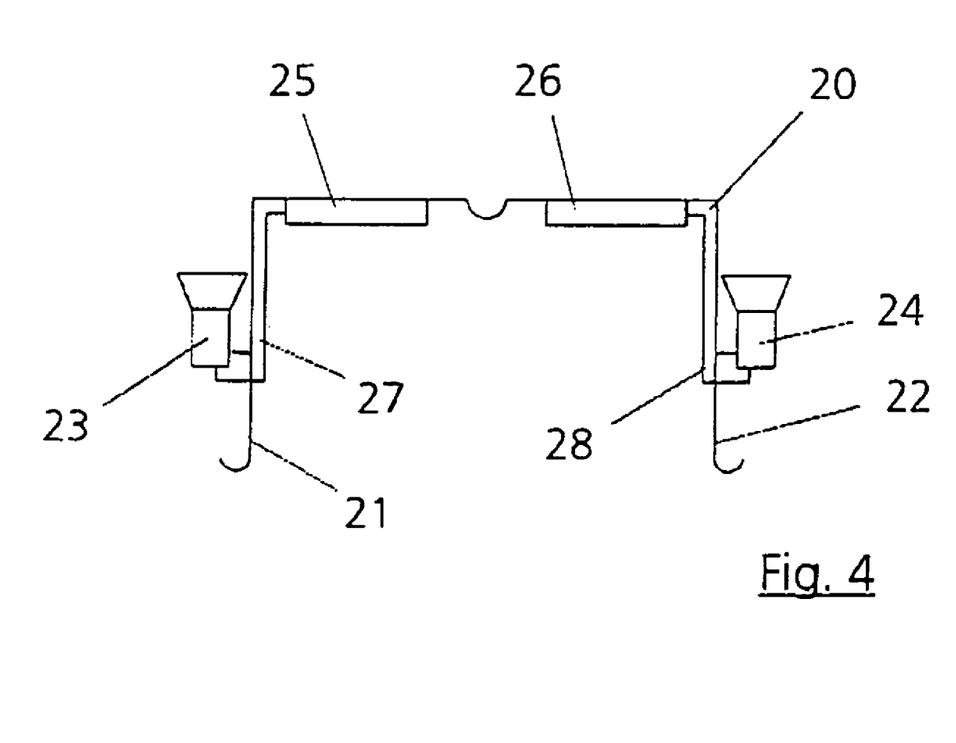
FIG. 4 shows an outlined illustration of a device designed as a head mounted thermal imager.

A further embodiment of the present invention is shown in FIG. 4. This embodiment has the design of a spectacle providing stereoscopic thermal imaging. The embodiment has a carrier structure designed like a spectacle frame 20 with a left and a right ear piece 21, 22. At both ear pieces 21, 22 or parallel thereof a respective one of two thermal imagers 23, 24 is arranged with their optical axes being parallel. In front of the eyes of the wearer two reproduction units 25, 26 are provided. The left reproduction unit 25 is connected to the output of the left thermal imager 23 by a connection line 27 and the right reproduction unit 26 is connected to the output of the right sided thermal imager 24 by a connection line 28. For adapting the distance of both reproduction units 25, 26 to the interpupillary distance of the wearer, the distance between both reproduction units 25, 26 is changeable.

What is claimed is:

1. A system for generating three-dimensional image displays comprising:
   a first and a second sensor,
   said first and said second sensor each comprising an optical channel with an optical axis, wherein the optical channel of said first sensor is different from the optical channel of said second sensor,
   said first and said second sensor each have a field of view with a size,
   wherein the size of the field of view of said first sensor is essentially identical with size of the field of view of said second sensor,
   wherein the optical axis of said optical channel of said first sensor is aligned in parallel with a horizontal spacing with respect to the optical axis of said second sensor,
   said first and said second sensor each comprising a detector being sensitive to infrared radiation, wherein recording of thermal images is performed simultaneously by said detectors of said first and said second sensor,
   comprising at least one image reproduction unit generating stereo image pairs of visible light from images recorded by said detectors of said first and said second sensor by detecting infrared light, and
   wherein said sensors are provided with cooled detectors.

2. The system according to claim 1, said system comprising two image reproduction units, a thermal image recorded with said first sensor being displayed on a first one of said two reproduction units and a thermal image recorded with said second sensor being displayed on a second one of said two reproduction units.

3. The system of claim 2, wherein said first and said second sensor are arranged in parallel on opposite sides of a support designed to be carried on a head, said support further comprising two reproduction units arranged at a distance, wherein said distance is adjustable.

4. The system according to claim 2, further comprising a basis plate and wherein said first and said second sensor are arranged in parallel next to one another on said basis plate and form a thermal imager-binoculars with a fixed stereo basis.

5. The system according to claim 4, wherein said reproduction units are arranged within eye pieces.

6. The system according to claim 5, wherein said eye pieces are arranged with a spacing there between and wherein said spacing is adjustable.

7. The system according to claim 1, wherein said two sensors are operated in an unsynchronized fashion.

8. The system according to claim 1, wherein said two sensors are operated in a synchronized fashion for providing stereoscopic image pairs.

9. The system according to claim 1, wherein said detectors are sensitive to radiation in a wavelength region between 0.8 µm and 2.5 µm.

10. The system according to claim 1, wherein said detectors are sensitive to radiation in a wavelength region from 3 µm to 5 µm.

11. The system according to claim 1, wherein said detectors are sensitive to radiation in a wavelength region from 7 µm to 14 µm.

12. Use of a system according to claim 1 for the field of military use.

13. Method for generating three-dimensional thermal image displays with the steps:
    providing two thermal imager sensors each having a detector sensitive to infrared radiation,
    adjusting said two thermal imager sensors to a common target area or target object with a virtually identical line of sight and fields of view of equal size,
    recording thermal images with said two sensors simultaneously, and
    displaying said thermal images recorded with said two sensors on at least one image reproduction unit simultaneously to form stereoscopic image pairs with light in the visible spectral region.

14. Use of a method according to claim 13 for the field of military use.

15. A system for generating three-dimensional image displays comprising:
    a first and a second sensor,
    said first and said second sensor each comprising an optical channel with an optical axis, wherein the optical channel of said first sensor is different from the optical channel of said second sensor,
    said first and said second sensor each have a field of view with a size,
    wherein the size of the field of view of said first sensor is essentially identical with size of the field of view of said second sensor,
    wherein the optical axis of said optical channel of said first sensor is aligned in parallel with a horizontal spacing with respect to the optical axis of said second sensor,
    said first and said second sensor each comprising a detector being sensitive to infrared radiation, wherein recording of thermal images is performed simultaneously by said detectors of said first and said second sensor,
    comprising at least one image reproduction unit generating stereo image pairs of visible light from images recorded by said detectors of said first and said second sensor by detecting infrared light, and
    wherein said first sensor is mounted on a rotatable basis having a motor drive and a control for controlling a rotation of said base by said motor drive, wherein said second sensor has a command key and wherein upon an activation of said command key said control of said base of said first sensor rotates said first sensor to direct said optical axis of said first sensor to be parallel to said optical axis of said second sensor.

16. A system for generating three-dimensional image displays comprising:
    a first and a second sensor,
    said first and said second sensor each comprising an optical channel with an optical axis, wherein the optical channel of said first sensor is different from the optical channel of said second sensor,
    said first and said second sensor each have a field of view with a size,
    wherein the size of the field of view of said first sensor is essentially identical with size of the field of view of said second sensor,
    wherein the optical axis of said optical channel of said first sensor is aligned in parallel with a horizontal spacing with respect to the optical axis of said second sensor,
    said first and said second sensor each comprising a detector being sensitive to infrared radiation, wherein recording of thermal images is performed simultaneously by said detectors of said first and said second sensor,
    comprising at least one image reproduction unit generating stereo image pairs of visible light from images recorded by said detectors of said first and said second sensor by detecting infrared light, and
    wherein said first sensor is arranged on a first moveable device and said second sensor is arranged on a second moveable device, said first and said second sensor having optics with an identical resolution, and wherein thermal images recorded with said first and said second sensor are displayed to one and the same observer simultaneously to generate stereoscopic image pairs.

17. A system for generating three-dimensional image displays comprising:
    a first and a second sensor,
    said first and said second sensor each comprising an optical channel with an optical axis, wherein the optical channel of said first sensor is different from the optical channel of said second sensor,
    said first and said second sensor each have a field of view with a size,
    wherein the size of the field of view of said first sensor is essentially identical with size of the field of view of said second sensor,
    wherein the optical axis of said optical channel of said first sensor is aligned in parallel with a horizontal spacing with respect to the optical axis of said second sensor,
    said first and said second sensor each comprising a detector being sensitive to infrared radiation, wherein recording of thermal images is performed simultaneously by said detectors of said first and said second sensor,
    comprising at least one image reproduction unit generating stereo image pairs of visible light from images recorded by said detectors of said first and said second sensor by detecting infrared light, and wherein said first and said second sensor are arranged on a single moveable device, said first and said second sensor having optics with an identical resolution, and wherein thermal images recorded with said first and said second sensor are displayed to one and the same observer simultaneously to generate stereoscopic image pairs.

18. The system according to claim 17, wherein said sensors are provided with cooled detectors.

19. A system for generating three-dimensional image displays comprising:
a first and a second sensor,
said first and said second sensor each comprising an optical channel with an optical axis, wherein the optical channel of said first sensor is different from the optical channel of said second sensor,
said first and said second sensor each have a field of view with a size,
wherein the size of the field of view of said first sensor is essentially identical with size of the field of view of said second sensor,
wherein the optical axis of said optical channel of said first sensor is aligned in parallel with a horizontal spacing with respect to the optical axis of said second sensor,
said first and said second sensor each comprising a detector being sensitive to infrared radiation, wherein recording of thermal images is performed simultaneously by said detectors of said first and said second sensor,
comprising at least one image reproduction unit generating stereo image pairs of visible light from images recorded by said detectors of said first and said second sensor by detecting infrared light, and
wherein said two sensors are combined in the manner of a II-driver's visual display unit to form a driver's thermal imager.

20. A system for generating three-dimensional image displays comprising:
a first and a second sensor,
said first and said second sensor each comprising an optical channel with an optical axis, wherein the optical channel of said first sensor is different from the optical channel of said second sensor,
said first and said second sensor each have a field of view with a size,
wherein the size of the field of view of said first sensor is essentially identical with size of the field of view, of said second sensor,
wherein the optical axis of said optical channel of said first sensor is aligned in parallel with a horizontal spacing with respect to the optical axis of said second sensor,
said first and said second sensor each comprising a detector being sensitive to infrared radiation, wherein recording of thermal images is performed simultaneously by said detectors of said first and said second sensor,
comprising at least one image reproduction unit generating stereo image pairs of visible light from images recorded by said detectors of said first and said second sensor by detecting infrared light,
wherein said first sensor is arranged on a first moveable device and said second sensor is arranged on a second moveable device, said first and said second sensor having optics with an identical resolution, and wherein thermal images recorded with said first and second sensor are displayed to one and the same observer simultaneously to generate stereoscopic image pairs, and
wherein said sensors are provided with cooled detectors.

21. The system according to claim 20, wherein said detectors are sensitive to radiation in a wavelength region from 3 µm to 5 µm.

22. The system according to claim 20, wherein said detectors are sensitive to radiation in a wavelength region from 7 µm to 14 m.

23. A system for generating three-dimensional image displays comprising:
a first and a second sensor,
said first and said second sensor each comprising an optical channel with an optical axis, wherein the optical channel of said first sensor is different from the optical channel of said second sensor,
said first and said second sensor each have a field of view with a size,
wherein the size of the field of view of said first sensor is essentially identical with size of the field of view of said second sensor,
wherein the optical axis of said optical channel of said first sensor is aligned in parallel with a horizontal spacing with respect to the optical axis of said second sensor,
said first and said second sensor each comprising a detector being sensitive to infrared radiation, wherein recording of thermal images is performed simultaneously by said detectors of said first and said second sensor,
at least one image reproduction unit generating stereo image pairs of visible light from images recorded by said detectors of said first and said second sensor by detecting infrared light,
two image reproduction units, a thermal image recorded with said first sensor being displayed on a first one of said two reproduction units and a thermal image recorded with said second sensor being displayed on a second one of said two reproduction units, and
a basis plate and wherein said first and said second sensor are arranged in parallel next to one another on said basis plate and form a thermal imager-binoculars with a fixed stereo basis.

24. The system according to claim 23, wherein said reproduction units are arranged within eye pieces.

25. The system according to claim 24, wherein said eye pieces are arranged with a spacing there between and wherein said spacing is adjustable.

26. The system according to claim 23, wherein said sensors are provided with uncooled detectors.

27. A system for generating three-dimensional image displays comprising:
a first and a second sensor,
said first and said second sensor each comprising an optical channel with an optical axis, wherein the optical channel of said first sensor is different from the optical channel of said second sensor,
said first and said second sensor each have a field of view with a size,
wherein the size of the field of view of said first sensor is essentially identical with size of the field of view of said second sensor,
wherein the optical axis of said optical channel of said first sensor is aligned in parallel with a horizontal spacing with respect to the optical axis of said second sensor, said first and said second sensor each comprising a detector being sensitive to infrared radiation, wherein recording of thermal images is performed simultaneously by said detectors of said first and said second sensor, comprising at least one image reproduction unit generating stereo image pairs of visible light from images recorded by said detectors of said first and said second sensor by detecting infrared light, and wherein said two sensors are operated in an unsynchronized fashion.

28. A system for generating three-dimensional image displays comprising:

a first and a second sensor, said first and said second sensor each comprising an optical channel with an optical axis, wherein the optical channel of said first sensor is different from the optical channel of said second sensor, said first and said second sensor each have a field of view with a size, wherein the size of the field of view of said first sensor is essentially identical with size of the field of view of said second sensor, wherein the optical axis of said optical channel of said first sensor is aligned in parallel with a horizontal spacing with respect to the optical axis of said second sensor, said first and said second sensor each comprising a detector being sensitive to infrared radiation, wherein recording of thermal images is performed simultaneously by said detectors of said first and said second sensor, comprising at least one image reproduction unit generating stereo image pairs of visible light from images recorded by said detectors of said first and said second sensor by detecting infrared light, and wherein said two sensors are operated in a synchronized fashion for providing stereoscopic image pairs.

* * * * *

UNITED STATES PATENT AND TRADEMARK OFFICE
CERTIFICATE OF CORRECTION

PATENT NO. : 7,098,458 B2 Page 1 of 1
APPLICATION NO. : 10/860879
DATED : August 29, 2006
INVENTOR(S) : Gunter Kuerbitz et al.

It is certified that error appears in the above-identified patent and that said Letters Patent is hereby corrected as shown below:

Col. 10, Line 10, Claim 22 –
 Replace "from 7 $\mu$m to 14 m."
 With --from 7 $\mu$m to 14 $\mu$m.--

Signed and Sealed this

First Day of May, 2007

JON W. DUDAS
*Director of the United States Patent and Trademark Office*